United States Patent [19]

Francis

[11] Patent Number: 5,663,706
[45] Date of Patent: Sep. 2, 1997

[54] TRANSITION ALERT SYSTEMS FOR AUTOMOTIVE VEHICLES

[76] Inventor: Joseph A. Francis, 580 E. 21st St., Apt.2-C, Brooklyn, N.Y. 11226

[21] Appl. No.: 505,677

[22] Filed: Jul. 21, 1995

[51] Int. Cl.$^6$ .................................................. B60Q 1/50
[52] U.S. Cl. .................. 340/464; 340/467; 340/468; 340/463; 340/471; 340/472; 340/457.3; 340/456
[58] Field of Search .................... 340/463, 464, 340/466, 467, 468, 471, 472, 479, 457.3, 456; 307/10.8

[56] References Cited

U.S. PATENT DOCUMENTS

| | | | |
|---|---|---|---|
| 2,835,880 | 5/1958 | Daws | 340/464 |
| 3,300,756 | 1/1967 | Miller | 340/463 |
| 3,568,146 | 3/1971 | Knez | 340/72 |
| 3,711,828 | 1/1973 | Hawkins | 340/66 |
| 4,020,455 | 4/1977 | Irimajiri et al. | 123/329 |
| 4,224,598 | 9/1980 | Ostrowski | 340/464 |
| 4,384,269 | 5/1983 | Carlson | 340/67 |
| 4,600,913 | 7/1986 | Caine | 340/435 |
| 4,629,043 | 12/1986 | Matsuo et al. | 192/4 A |
| 4,843,368 | 6/1989 | Poulos | 340/464 |
| 4,916,431 | 4/1990 | Gearey | 340/479 |
| 4,924,207 | 5/1990 | Lariscy | 340/464 |
| 4,970,493 | 11/1990 | Yim | 340/463 |
| 5,089,805 | 2/1992 | Salsman | 340/467 |
| 5,111,181 | 5/1992 | Priesemuth | 340/467 |
| 5,172,095 | 12/1992 | Scott | 340/479 |
| 5,376,918 | 12/1994 | Vinciguerra et al. | 340/479 |
| 5,381,135 | 1/1995 | Blount | 340/463 |
| 5,486,808 | 1/1996 | Nejdl | 340/464 |

*Primary Examiner*—Jeffery Hofsass
*Assistant Examiner*—Ashok Mannava
*Attorney, Agent, or Firm*—Richard L. Miller, P.E.

[57] ABSTRACT

An automotive vehicle alert system for indicating changes in vehicle operation mode. The automotive vehicle rear end collision prevention system includes a power source, brake switching apparatus connected in series to the power source and responsive to the position of the brake pedal of the automotive vehicle, accelerator switching apparatus connected in series to the power source and responsive to the position of the accelerator pedal of the automotive vehicle, and a light disposed at a high point of the automotive vehicle rear and connected in series to the power source. When the brake pedal and the accelerator pedal are both released, the brake switching apparatus and the accelerator switching apparatus closes illuminating the light and warning a trailing automotive vehicle that the automotive vehicle is changing operation which prevents rear end collisions, discourage tailgating and panic stops under normal traffic conditions, and improve visibility and perception.

17 Claims, 1 Drawing Sheet

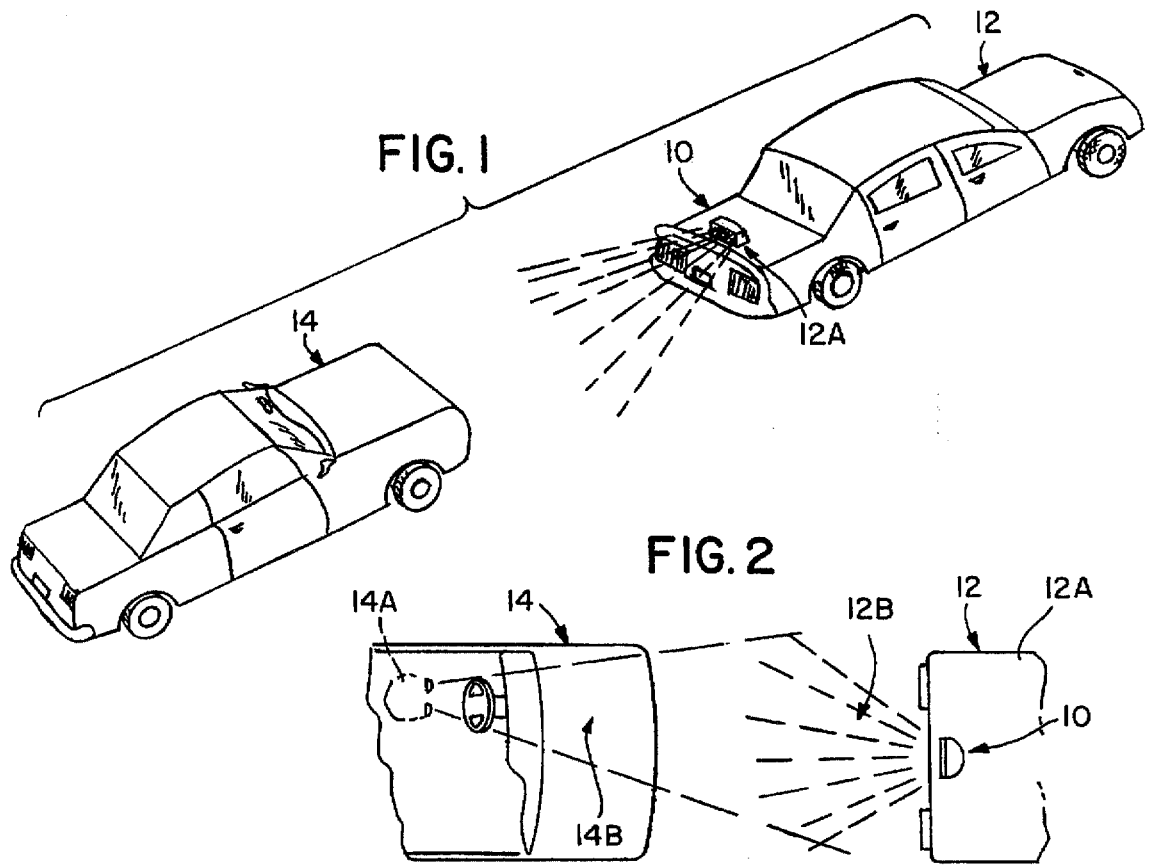
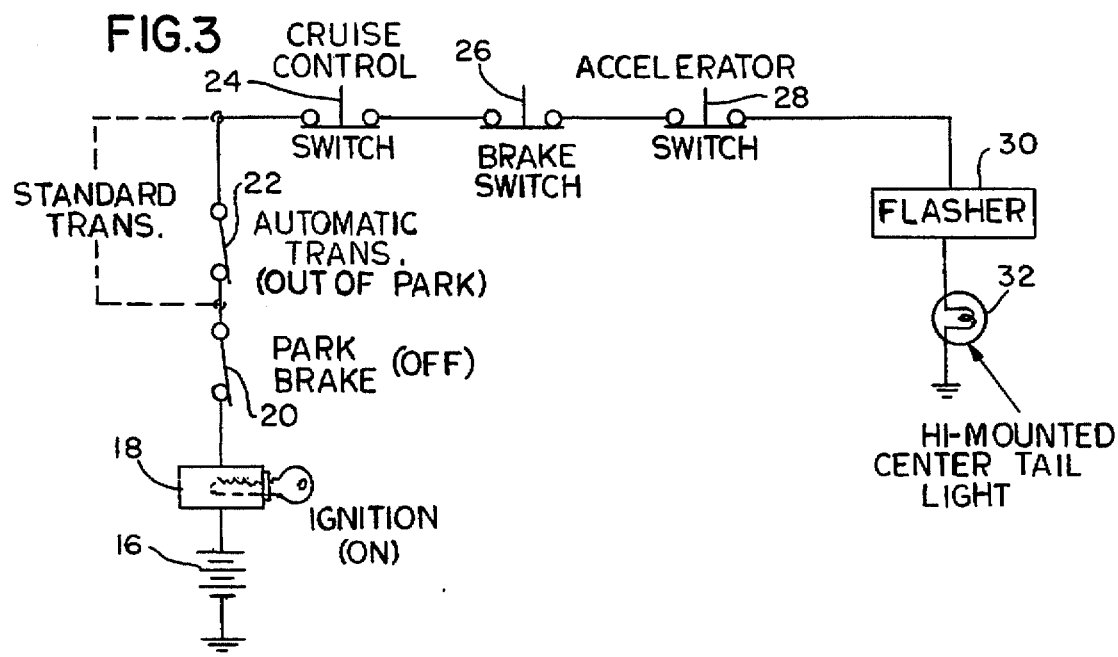

TRANSITION ALERT SYSTEMS FOR AUTOMOTIVE VEHICLES

BACKGROUND OF THE INVENTION

The present invention relates to an automotive vehicle alert system. More particularly, the present invention relates to an automotive vehicle alert system for indicating changes in vehicle operation.

Rear end collisions have long been a serious driving hazard. Such rear end collisions are believed to occur as a result of the maintenance of too small an interval between vehicles for the speed of the vehicles, and driver error. Driver error may occur either from a hypnotic effect or confusion. A hypnotic effect results from constant speed driving in a relative straight line, such as occurs on modern expressways and highways, and results in the inability of the driver to react rapidly to changes in traffic conditions.

As every motor vehicle driver knows, and as is encountered almost daily when driving in traffic, the brake lights of a motor vehicle that is in front of the driver already begin to light up as soon as the brake is actuated and contacted slightly by the driver, even though in actuality no braking effect has occurred yet.

The result of this is that often motorist driving behind such a vehicle become alarmed because based on the overall traffic situation there appears to be absolutely no reason for braking. As a result of this alarm, a driver who has noticed the brake lights of the vehicle in front of him lighting up often himself abruptly brakes his vehicle, and sometimes even more severely. Out of a completely noncritical driving situation in flowing traffic, a chain reaction, and hence serious accidents, can occur that can involve a number of vehicles that are driving behind one another in the manner of a column, since the chain reaction could continue to the last member of the column.

Another potentially hazardous situation occurs when a momentarily slowed vehicle is re-accelerated. When the brake pedal is released, the driver in the following vehicle is likely to begin accelerating his vehicle as well. If the driver in the leading vehicle suddenly brakes while the driver behind is accelerating, then the chances of a rear end collision are greatly increased.

Numerous innovations for automotive vehicle alert systems have been provided in the prior art that will be described. However, even though these innovations may be suitable for the specific individual purposes to which they address, they differ from the present invention in that they do not teach separate switching means adapted to vehicle accelerator means, vehicle braking means, and vehicle cruise controlling means that close when the accelerator means, the vehicle braking means, and the vehicle cruise controlling means is disengaged, which in turn flashes a light disposed on the rear of the vehicle.

For example, U.S. Pat. No. 3,568,146 to Knez teaches a rear-alerting signal for an automotive vehicle in which actuation of a speed control, such as, the brake of the vehicle causes immediate flashing of two lamps disposed at the rear of the vehicle. The two lamps are connected in separate electrical circuits with separate switches and a source of power, and both of the switches are controlled by a cam to alternately close the switches.

Another example, U.S. Pat. No. 3,711,828 to Hawkins teaches a device for indicating acceleration and deceleration of the vehicle. A Bourdon tube connected to the engine intake manifold of the vehicle has a free end that is movable relative to a vacuum developed within the manifold. An electrical switch operable by the free end is connected to a pair of relays. The tube, switch, and relays are mounted within a box having terminal outlets connected to a source of electrical energy and to a pair of light bulbs mounted to the vehicle. One bulb energizes upon vehicle acceleration whereas the other bulb energizes upon vehicle deceleration.

Still another example, U.S. Pat. No. 4,384,269 to Carlson teaches an electronic acceleration/deceleration warning system for a vehicle which includes an electro-mechanical transducer, such as, an arrangement of pendulum, light source and photocells, that converts acceleration or deceleration of the vehicle into an electrical quantity relative to the rate of deceleration, an oscillator having a variable frequency output, a circuit connected to the transducer and oscillator for varying the frequency of the oscillator output signal in proportion to the vehicle deceleration, and a pair of warning lamps horizontally disposed on the rear end of the vehicle and connected to the oscillator in a manner such that the lamps flash alternately and at a rate relative to the vehicle deceleration.

Yet another example, U.S. Pat. No. 4,843,368 to Poulos teaches a device for attachment in a vehicle brake light circuit that causes flashing of the brake lights when the vehicle undergoes an enhanced degree of deceleration. The device includes an accelerometer for determining when the enhanced degree of deceleration is reached, a first circuit component to determine whether the incoming power to the brake lights are for brake light operation or turn signal operation, a second circuit component to activate a pulse generating component, a timer component to stop the pulse generating component after a predetermined period of time, and means to accommodate these various inputs and produce a time pulse flashing in the brake lights.

Still yet another example, U.S. Pat. No. 5,089,805 to Salsman teaches a vehicle deceleration indicator device which operates with the braking system of the vehicle. The device includes an array of lights, inertia switch apparatus and interconnecting circuitry. The switch apparatus is mounted on a swingable arm which at all times remains at true vertical. Arm 4 a brake apparatus is actuated when the vehicle is braked to secure the arm at true vertical and inertias acts against the switch apparatus to sequentially activate the lights of the array.

Yet still another example, U.S. Pat. No. 5,111,181 to Priesemuth teaches an arrangement for recognizing, via brake lights provided on a vehicle, whether or not the vehicle is slowing down, whereby the brake lights can be turned on upon activation of a vehicle brake. A sensor mechanism is provided that delivers a signal and/or a succession of signals having a value that corresponds to the deceleration state of the vehicle at any given time. The brake lights are electrically activated in a manner that corresponds to the value of the signal at least upon activation of the vehicle brake.

Finally another example, U.S. Pat. No. 5,172,095 to Scott teaches a vehicle brake light system that includes an auxiliary brake light and a deceleration brake light both connected to a current source through a brake switch. A timer control module is operatively connected with the brake switch, the auxiliary brake light, and the deceleration light and causes the auxiliary brake light to flash "on" and "off" while the brake pedal switch is closed and for a predetermined period after the brake pedal switch assumes an open state.

It is apparent that numerous innovations for automotive vehicle alert systems have been provided in the prior art that are adapted to be used. Furthermore, even though these innovations may be suitable for the specific individual purposes to which they address, they would not be suitable for the purposes of the present invention as heretofore described.

SUMMARY OF THE INVENTION

Accordingly, an object of the present invention is to provide a transition alert system for automotive vehicles that avoids the disadvantages of the prior art.

Another object of the present invention is to provide a transition alert system for automotive vehicles that is simple and inexpensive to manufacture.

Still another object of the present invention is to provide a transition alert system for automotive vehicles that is simple and easy to use.

Yet another object of the present invention is to provide a transition alert system for automotive vehicles that warns a trailing vehicle of changing operation of a preceding vehicle.

Still yet another object of the present invention is to provide a transition alert system for automotive vehicles that gives a trailing vehicle additional time to prepare for the changing operation of the preceding vehicle.

Yet still another object of the present invention is to provide a transition alert system for automotive vehicles that would prevent rear end collisions, discourage tailgating and panic stops under normal traffic conditions, and improve visibility and perception.

Still yet another object of the present invention is to provide a transition alert system for automotive vehicles that includes a power source, brake switching apparatus connected in series to the power source and responsive to the position of the brake pedal of the automotive vehicle, accelerator switching apparatus connected in series to the power source and responsive to the position of the accelerator pedal of the automotive vehicle, and a light disposed at a high point of the automotive vehicle rear and connected in series to the power source so that when the brake pedal and the accelerator pedal are both released the brake switching apparatus and the accelerator switching apparatus closes illuminating the light and warning a trailing automotive vehicle that the automotive vehicle is changing operation.

Yet still another object of the present invention is to provide a transition alert system for automotive vehicles wherein the power source is the conventional car battery used in the automotive vehicle.

Still yet another object of the present invention is to provide a transition alert system for automotive vehicles that further includes ignition switching apparatus.

Yet still another object of the present invention is to provide a transition alert system for automotive vehicles wherein the ignition switching means includes the conventional ignition switch used in the automotive vehicle.

Still yet another object of the present invention is to provide a transition alert system for automotive vehicles that further includes parking brake switching apparatus. Yet still another object of the present invention is to provide a transition alert system for automotive vehicles wherein the parking brake switching apparatus includes the conventional parking brake indicator switch.

Still yet another object of the present invention is to provide a transition alert system for automotive vehicles wherein the parking brake switching apparatus includes the conventional parking brake switch.

Yet still another object of the present invention is to provide a transition alert system for automotive vehicles wherein the parking brake switching apparatus includes a separate solenoid switch that is open when the parking brake is engaged and closed when the parking brake is disengaged.

Still yet another object of the present invention is to provide a transition alert system for automotive vehicles that further includes transmission switching apparatus.

Yet still another object of the present invention is to provide a transition alert system for automotive vehicles wherein the transmission switching apparatus includes the conventional transmission position indicator.

Still yet another object of the present invention is to provide a transition alert system for automotive vehicles wherein the transmission switching apparatus includes a separate solenoid switch that is open when the transmission is in park and closed when the transmission is not in park.

Yet still another object of the present invention is to provide a transition alert system for automotive vehicles that further includes cruise control switching apparatus.

Still yet another object of the present invention is to provide a transition alert system for automotive vehicles wherein the cruise control switching apparatus includes the conventional cruise control on/off switch.

Yet still another object of the present invention is to provide a transition alert system for automotive vehicles wherein the cruise control switching apparatus includes the conventional cruise control engaging button.

Still yet another object of the present invention is to provide a transition alert system for automotive vehicles wherein the brake switching apparatus includes the conventional brake light switch.

Yet still another object of the present invention is to provide a transition alert system for automotive vehicles wherein the brake switching apparatus includes a separate solenoid switch that is open when the brake pedal is pressed and closed when brake pedal is released.

Still yet another object of the present invention is to provide a transition alert system for automotive vehicles wherein the accelerator switching apparatus includes a solenoid switch that is open when the accelerator pedal is pressed and closed when the accelerator pedal is released.

Yet still another object of the present invention is to provide a transition alert system for automotive vehicles that further includes a flasher connected in series to the power source for providing rapid pulse flashing of the light.

Finally another object of the present invention is to provide a transition alert system for automotive vehicles wherein the light has an amber lens to distinguish it from the high mounted red brake light.

The novel features which are considered characteristic of the present invention are set forth in the appended claims. The invention itself, however, both as to its construction and its method of operation, together with additional objects and advantages thereof, will be best understood from the following description of the specific embodiments when read and understood in connection with the accompanying drawing.

BRIEF DESCRIPTION OF THE DRAWING

The figures in the drawing are briefly described as follows:

FIG. 1 a diagrammatic perspective view of the instant invention installed and in use;

FIG. 2 is an enlarged partial plan view illustrating the installed invention being observed by the driver of a trailing vehicle; and FIG. 3 is a schematic diagram illustrating the circuitry of the instant invention when the vehicle is free wheeling.

LIST OF REFERENCE NUMERALS UTILIZED IN THE DRAWING 10-transition alert system for automotive vehicles of the present invention
12-automotive vehicle
12A-automotive vehicle rear
12B-light beam
14-trailing automotive vehicle
14A-driver
14B-line of sight
16-power source
18-ignition switching means
20-parking brake switching means
22-transmission switching means
24-cruise control switching means
26-brake switching means
28-accelerator switching means
30-flasher
32-light

DETAILED DESCRIPTION OF THE PREFERRED EMBODIMENT

Referring now to the drawing in which like numerals indicate like parts, and particularly to FIGS. 1 and 2, the transition alert system for automotive vehicles of the present invention is shown generally at 10 mounted to the high point of the automotive vehicle rear 12A of an automotive vehicle 12.

The transition alert system for automotive vehicles 10 resembles a conventional taillight and provides a light beam 12B that is in the line of sight 14B of the driver 14A of a trailing automotive vehicle 14. The transition alert system for automotive vehicles 10 warns the driver 14A of the trailing automotive vehicle 14 that the preceding automotive vehicle 12 is changing its operation, that is, braking, accelerating, and cruise controlling.

This provides additional time to prepare for the changing of the operation of the preceding automotive vehicle 12 which would prevent rear end collisions, discourage tailgating and panic stops under normal traffic conditions while improving visibility and perception.

The configuration of the transition alert system for automotive vehicles 10 can best be seen in FIG. 3, and as such, will be discussed with reference thereto.

The transition alert system for automotive vehicles 10 includes a power source 16, ignition switching means 18 connected in series with the power source 16, parking brake switching means 20 connected in series with the power source 16, transmission switching means 22 connected in series with the power source 16 and applicable only to an automatic transmission equipped vehicle not to a standard transmission equipped vehicle, cruise control switching means 24 connected in series with the power source 16 and applicable only to a cruise control equipped vehicle, brake switching means 26 connected in series with the power source 16, accelerator switching means 28 connected in series with the power source 16, a flasher 30 connected in series with the power source 16, and a light 32 connected in series with the power source 16.

The power source 16 makes use of the conventional battery of the automotive vehicle 12 and is of the standard 6-Volt or 12-Volt variety.

The ignition switching means 18 makes use of the conventional ignition switch of the automotive vehicle 12 that is usually located either on the steering column or on the dash board.

The parking brake switching means 20 makes use of either the conventional parking brake indicator switch that is usually located on the dashboard, the conventional parking brake switch that is located on the parking brake pedal, or may be a separate solenoid switch that is open when the parking brake is engaged and closed when the parking brake is disengaged.

The transmission switching means 22 makes use of the conventional transmission position indicator switch that is usually located either on the steering column or on the dashboard, or may be a separate solenoid switch that is open when the transmission is in park and closed when the transmission is not in park.

The cruise control switching means 24 makes use of the conventional cruise control on/off switch that is usually located on the dashboard, the conventional cruise control engaging button that is usually located on the turn signal indicator, or may be a separate solenoid switch that is open when the cruise control is engaged and closed when the cruise control is disengaged.

The brake switching means 26 makes use of the conventional brake light switch that is located on the brake pedal or a separate solenoid switch that is open when the brake pedal is pressed and closed when brake pedal is released.

The accelerator switching means 28 includes a solenoid switch that may be located on the accelerator pedal and which is open when the accelerator pedal is pressed and closed when the accelerator pedal is released.

The flasher 30 is of the conventional rapid pulse variety. The light 32 is of the conventional tail light variety and may have an amber lens to distinguish it from the high mounted red brake light.

The transition alert system for automotive vehicles 10 is operable only when the conventional ignition switch is turned on closing the ignition switching means 18, the conventional automatic transmission lever is removed from park closing the transmission switching means 22, and the conventional parking brake is released closing the parking brake switching means 20.

Initially, since both the brake pedal and the accelerator pedal are not depressed, both the brake switching means 26 and the accelerator switching means 28 are closed causing the light 32 to flash via the flasher 30.

The light 32 will continue to flash until either the accelerator pedal is depressed causing the accelerator switching means 28 to open, the cruise control is engaged causing the cruise control switching means 24 to open, or the brake pedal is depressed causing the brake switching means 26 to open.

Subsequently, when pressure is applied to either the accelerator pedal, the brake pedal, or the cruise control is engaged, the accelerator switching means 28, the brake switching means 26, or the cruise control switching means 24, respectively, will open causing the light 32 to cease flashing. When pressure is released from the accelerator pedal closing the accelerator switching means 28, the light 32 will flash indicating to the driver 14A of the trailing automotive vehicle 14 that the driver of the preceding automotive vehicle 12 has released the accelerator pedal and is no longer accelerating. However, when the driver of the preceding automotive vehicle 12 depresses the brake pedal, the light 32 will cease flashing but the normal brake lights will go on indicating that the automotive vehicle 12 is decelerating. The light 32 gives the driver 14A of the trailing vehicle 14 additional time to adjust to the changing operation of the preceding automotive vehicle 12, that is, the time interval from when the driver releases the accelerator pedal and depresses the brake pedal or engages the cruise control, or the time interval from when the driver releases the brake pedal and depresses the accelerator pedal or engages the cruise control. When the accelerator pedal is released, the light 32 will flash giving the driver 14A of the trailing automotive vehicle 14 more time to respond before the brake pedal is actually depressed and the distance between the automotive vehicle 12 and the trailing automotive vehicle 14 decreases.

It will be understood that each of the elements described above, or two or more together, may also find a useful application in other types of constructions differing from the types described above.

While the invention has been illustrated and described as embodied in a transition alert system for automotive vehicles, it is not limited to the details shown, since it will be understood that various omissions, modifications, substitutions and changes in the forms and details of the device illustrated and its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this invention.

The invention claimed is:

1. An automotive vehicle rear end collision prevention system that prevents a rear end collision to an automotive vehicle wherein the automotive vehicle has a rear with a high point, an accelerator pedal with a position, a parking brake with a position, a transmission with a gear selection, passenger compartment, a battery, and a brake pedal with a position, said system comprising:

a) brake switching means being responsive to the position of the brake pedal of the automotive vehicle; said brake switching means being closed when the brake pedal of the automotive vehicle is released and required to be closed for said automotive vehicle rear end collision prevention system to operate, so that the brake pedal of the automotive vehicle must be released for said automotive vehicle rear end collision prevention system to operate;

b) accelerator switching means connected in series to said brake switching means and being responsive to the position of the accelerator pedal of the automotive vehicle; said accelerator switching means being located on the accelerator pedal of the automotive vehicle; said accelerator switching means being closed when the accelerator pedal of the automotive vehicle is released and required to be closed for said automotive vehicle rear end collision prevention system to operate, so that the accelerator pedal of the automotive vehicle must be released for said automotive vehicle rear end collision prevention system to operate;

c) parking brake switching means connected in series to said brake switching means and said accelerator switching means and being responsive to the position of the parking brake of the automotive vehicle; said parking brake switching means being closed when the parking brake of the automotive vehicle is released and required to be closed for said automotive vehicle rear end collision prevention system to operate, so that the parking brake of the automotive vehicle must be released for said automotive vehicle rear end collision prevention system to operate;

d) transmission switching means connected in series to said brake switching means, said parking brake switching means, and said accelerator switching means and being responsive to the gear selection of the transmission of the automotive vehicle; said transmission switching means being closed when the transmission of the automotive vehicle is out of park and in any other gear and required to be closed for said automotive vehicle rear end collision prevention system to operate, so that the transmission of the automotive vehicle must be out of park for said automotive vehicle rear end collision prevention system to operate; and e) a light disposed at the high point of the rear of the automotive vehicle external to the passenger compartment of the automotive vehicle; said light being connected in series to said brake switching means, said accelerator switching means, said parking brake switching means, and said transmission switching means and being illuminated when said brake switching means, said accelerator switching means, said parking brake switching means, and said transmission switching means are closed, so that when the brake pedal of the automotive vehicle, the parking brake of the automotive vehicle, and the accelerator pedal of the automotive vehicle are released and the transmission of the automotive vehicle is out of park and in any other gear, said brake switching means, said parking brake switching means, said transmission switching means, and said accelerator switching means close illuminating said light and warning a trailing automotive vehicle that the automotive vehicle is changing operation.

2. The system as defined in claim 1; further comprising a power source being the battery of the automotive vehicle.

3. The system as defined in claim 1; further comprising ignition switching means.

4. The system as defined in claim 3, wherein said ignition switching means includes the conventional ignition switch used in said automotive vehicle.

5. The system as defined in claim 1, wherein said parking brake switching means includes the conventional parking brake indicator switch.

6. The system as defined in claim 1, wherein said parking brake switching means includes the conventional parking brake switch.

7. The system as defined in claim 1, wherein said parking brake switching means includes a separate solenoid switch that is open when the parking brake is engaged and closed when the parking brake is disengaged.

8. The system as defined in claim 1, wherein said transmission switching means includes the conventional transmission position indicator.

9. The system as defined in claim 1, wherein said transmission switching means includes a separate solenoid switch that is open when the transmission is in park and closed when the transmission is not in park and in any other gear.

10. The system as defined in claim 1, wherein the automotive vehicle has cruise control with a position; said automotive vehicle rear end collision prevention system further comprising cruise control switching means connected in series to said brake switching means, said accelerator switching means, said parking brake switching means, and said transmission switching means and being responsive to the position of the cruise control of the automotive vehicle; said cruise control switching means being closed when the cruise control of the automotive vehicle is disengaged and required to be closed for said automotive vehicle rear end collision prevention system to operate, so that the cruise control of the automotive vehicle must be disengaged for said automotive vehicle rear end collision prevention system to operate.

11. The system as defined in claim 10, wherein said cruise control switching means includes the conventional cruise control on/off.

12. The system as defined in claim 10, wherein said cruise control switching means includes the conventional cruise control engaging button.

13. The system as defined in claim 1, wherein said brake switching means includes the conventional brake light switch.

14. The system as defined in claim 1, wherein said brake switching means includes a separate solenoid switch that is open when the brake pedal is pressed and closed when brake pedal is released.

15. The system as defined in claim 1, wherein said accelerator switching means includes a solenoid switch that is open when the accelerator pedal is pressed and closed when the accelerator pedal is released.

16. The system as defined in claim 1; further comprising a flasher connected in series to said power source for providing rapid pulse flashing of said light.

17. The system as defined in claim 1, wherein said light has an amber lens to distinguish it from the high mounted red brake light.

\* \* \* \* \*